United States Patent [19]

LaWhite et al.

[11] 4,056,263
[45] Nov. 1, 1977

[54] DRUMLESS PAPER TRANSPORTER

[75] Inventors: Eric L. LaWhite, South Royalton, Vt.; Ernest G. Henrichon, Jr., Wellesley Hills; Harvey J. Bloom, Bellingham, both of Mass.

[73] Assignee: Xicon Data Entry Corporation, Newton Upper Falls, Mass.

[21] Appl. No.: 639,802

[22] Filed: Dec. 11, 1975

Related U.S. Application Data

[63] Continuation-in-part of Ser. No. 477,809, June 10, 1974, Pat. No. 3,941,375.

[51] Int. Cl.² ............................................. B65H 9/16
[52] U.S. Cl. ..................................... 271/3; 271/174; 271/251; 271/275; 346/138; 358/291
[58] Field of Search ................. 271/251, 275, 274, 3, 271/250, DIG. 2, 174, 4, 276, 277, 64; 346/138, 132, 125; 358/291 X

[56] References Cited

U.S. PATENT DOCUMENTS

| | | |
|---|---|---|
| 2,695,785 | 11/1964 | Dashiell et al. ............... 271/275 X |
| 3,012,775 | 12/1961 | Buslik et al. ...................... 271/251 |
| 3,632,105 | 1/1972 | Verhoeven .......................... 271/64 |
| 3,635,466 | 1/1972 | Townsend .......................... 271/251 |
| 3,646,532 | 2/1972 | Winter ........................... 271/251 X |
| 3,790,159 | 2/1974 | Hatzmann et al. .................. 271/4 |
| 3,925,607 | 12/1975 | Hauber ................................. 178/7.1 |

Primary Examiner—Bruce H. Stoner, Jr.
Attorney, Agent, or Firm—Kenway & Jenney

[57] ABSTRACT

A drumless paper transporter carries a sheet of paper on a relatively narrow hub located near one end of the sheet. A plurality of canted idler rollers that surround the periphery of the hub dynamically adjust the sheet against a reference edge as the hub rotates. A plurality of guards surround the sheet at least in the region between adjacent idler wheels. In a preferred form, a flexible brush located interior to the path of rotation of the sheet has a free edge opposed by a fixed abutment member located exterior to the path to form a converging wall guide that accurately controls the radial position of the sheet. Also, a stripper blade reliably removes the paper from the hub during continuous operations by pivoting an edge interior to the path of rotation to direct the approaching sheet to an exit slot.

5 Claims, 3 Drawing Figures

DRUMLESS PAPER TRANSPORTER

BACKGROUND OF THE INVENTION

This is a continuation-in-part of application Ser. No. 477,809 filed June 10, 1974, now U.S. Pat. No. 3,941,375.

This invention relates to paper handling devices and more specifically to paper transporters for use in conjunction with optical character readers.

It is well known in the art to scan a printed page with an optical character reader (OCR) or the like by mechanically transporting the page under a scanning pick-up head. One arrangement utilizes a high-speed shuttle mechanism with reciprocates the page in a tray. Other systems in common use mount the pick-up head on a high speed reciprocating shuttle. Another arrangement, having well-known speed, handling and cost advantages, is to carry the page on a rotating drum. As the page rotates under a scanner, the OCR reads a narrow section or swath of the page which usually corresponds to a single printed line. On successive revolutions, the scanner indexes to read an adjacent swath until the entire page is read.

A paper transporter for use in conjunction with an OCR, including the drum type transporters, must exhibit a number of operating characteristics and capabilities. First, it must stabilize the position and spatial orientation of the paper with respect to a pick-up head or scanner device of the OCR. The paper position is usually secured by belts or wheels acting on the exterior surface of the drum or by a mechanical or vacuum arrangement carried on the drum. Manual placement of the paper or guidance by a reference surface are common methods for aligning the paper on the drum. It is also important that the paper maintain the proper position and alignment during multiple revolutions of the drum. If the proper alignment is not achieved and maintained, the lines of print will not fall in a single reading swath and reading errors will occur. Also, the paper must be controlled without blocking or obscuring any of the printed characters on the sheet.

Another important operating characteristic of a paper transporter for use in conjunction with an OCR is that its operating should be continuous as successive sheets are fed onto and removed from the transporter. For example, many rotating drum transporter systems used in duplicating systems are unsuitable for use in conjunction with OCRs since they require the drum to come to a complete stop each time a new page is placed on the drum. Such transporters typically employ mechanical or vaccuum techniques to secure the paper in the desired position on the drum. Other significant aspects of the continuous operation capability are that the transporter must be relatively free of paper jams, and it must reliably remove the paper from the drum when the scanning is completed, even if the paper adheres to the drum due to the build up of an electrostatic charge. Also, a high speed, continuous operation transporter for OCR applications must be able to accept paper in a variety of conditions, including paper with creases, wrinkles, bent corners, ragged edges and the like, with low likelihood of jamming, and if a jam should occur, it is important to be able to clear the jam quickly and conveniently.

One type of rotating drum transporter utilizes two belts, or sets of belts, that substantially encircle the drum at both of its ends. The belts rotate the drum and simultaneously grip and transport the paper carried on the exterior surface of the drum. It has been found, however, that this arrangement has various disadvantages which severly limit its effectiveness in reading lines of print, and particularly multiple lines of print that extend over substantially the entire surface of a sheet of paper. First, it is difficult to align the paper accurately so that each line of print lies in a plane that is substantially normal to the longitudinal axis of the drum. Second, if a proper alignment is achieved, it is often difficult to maintain this alignment throughout the relatively large number of revolutions required to read a standard typed or printed page. For example, if the paper is initially inserted into the carrier at a slight angle, this alignment can cause the page to advance longitudinally with each revolution. This in turn can cause the scanner to loose synchronization within a line or between lines, read two or more lines in one scan, or completely omit certain lines. Further, even if the paper is inserted correctly, slight differences in the speed, orientation, or tension of a belt located at opposite ends of the drum can cause an objectionable skewing of the paper resulting in the progressive longitudinal shift in the paper's position relative to the drum. Another significant disadvantage of this type of transporter is that it cannot continuously scan the succession of papers since removal of each page requires that the drum come to a complete stop and be manually rotated in a direction reverse to its normal direction of rotation.

Another arrangement which avoids some of the problems associated with the two-belt system utilizes a single belt mounted over a central portion of the rotating drum and substantially encircling the drum except for a relatively small entrance and exit clearance formed between the looped belt ends. This arrangment, however, is unsuitable for reading pages of printed documents since the belt obscures a portion of the print. Another problem is that after a period of operation, the belt tends to accumulate the ink or pencil material forming the printed characters and transfers it to subsequent pages being transported and read.

It is also known in the context of a document alignment station to utilize spring loaded roller assemblies that align a document by sliding it over the exterior surface of a drum against a reference edge. This alignment occurs during a small partial revolution of the drum. Once aligned the force of gravity strips the document from the drum and directs it to an exit chute.

While this document alignment system avoids some of the difficulties inherent in the belt transporters described hereinabove, it does not have the characteristics and capabilities delineated hereinabove required of a high speed transporter for use in conjunction with an OCR. First, it is not designed to carry a document for even one full revolution on the drum. Second, if it could be so used, the document would exit through the exit chute after only one revolution at most. Third, the use of gravity to strip and remove the document from the drum is unreliable at best if an electrostatic charge develops between the document and the drum during the time it is transported.

It is therefore a principal object of this invention to provide a paper transporter for use in conjunction with an OCR that maintains the paper in an accurately predetermined spatial orientation and position with respect to the scanning element of the optical character reader during multiple revolutions of the paper, does not obscure printed characters on the paper and minimizes the development of an attractive static charge between the paper and the transporter.

A further object of this invention is to provide a paper transporter for use in conjunction with an OCR that accepts sheets in an imperfect condition with a minimum likelihood of a paper jam, and facilitates clearance of any jam that does occur.

Another object of this ivention is to provide a paper transporter suitable for continuous high speed operation that reliably directs the paper to an exit means at a preselected time without stopping the transporter or performing manual operatations.

Yet another object is to provide a paper transporter having these advantages and has a relatively low cost of manufacture.

SUMMARY OF THE INVENTION

This invention provides a drumless paper transporter that carries a sheet of paper on a relatively narrow peripheral surface of a rotating hub located adjacent to one end of the paper. A set of canted rollers that bear against the paper carrying surface of the hub dynamically adjust the paper against a reference edge aligned in a direction substantially transverse to the axis of rotation of the hub. Guide means, preferably in the form of a set of curved plates spaced closely from the paper carrying surface of the hub and extending longitudinally the full length of the paper, assist in maintaining the paper in a generally cylindrical path of rotation defined by the peripheral surface of the hub. Spacings between the guide means form longitudinally extending paper entrance, paper exit, and viewing slots. Reliable depth of field control is preferably provided at the viewing slot by a flexible brush located interior to the path of rotation of the paper which acts in cooperation with an opposed abutment strip located exterior to the path of rotation to guide the paper to an accurately predetermined position with respect to the axis of rotation. In a preferred form automatic paper feed and removal means are associated with the paper entrance slot and the paper exit slot, respectively. The paper removal means is preferably in the form of a stripper blade that pivots to direct an approaching sheet from the hub and into the paper exit slot.

These and other features of this invention will be more fully understood from the following detailed description of the preferred embodiments which should be read in conjunction with the accompanying drawings.

DETAILED DESCRIPTION OF THE PREFERRED EMBODIMENTS

Figure 1:
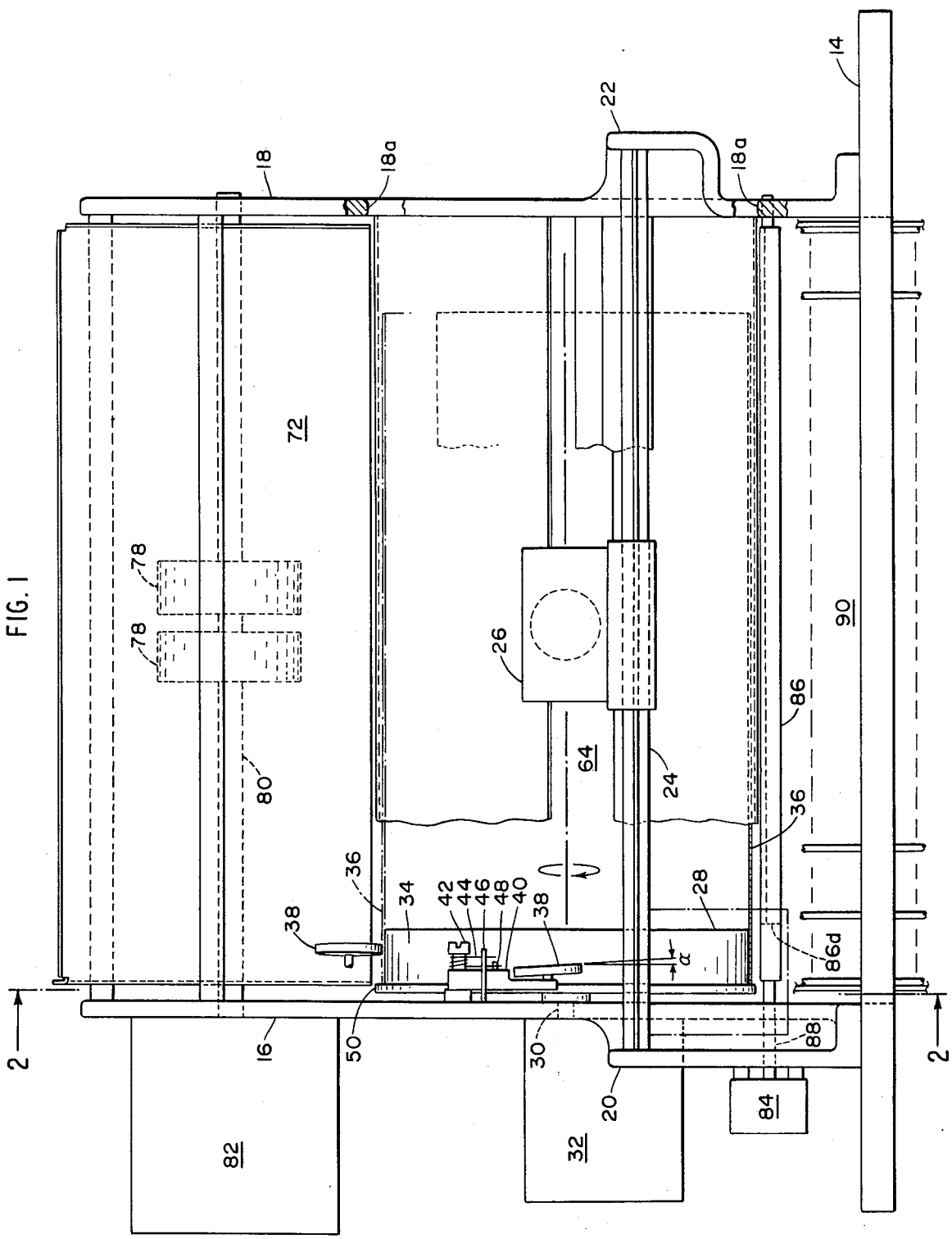
FIG. 1 is a front elevation view in partial section of the preferred embodiment of a paper transporter constructed in accordance with the invention.
Figure 2:
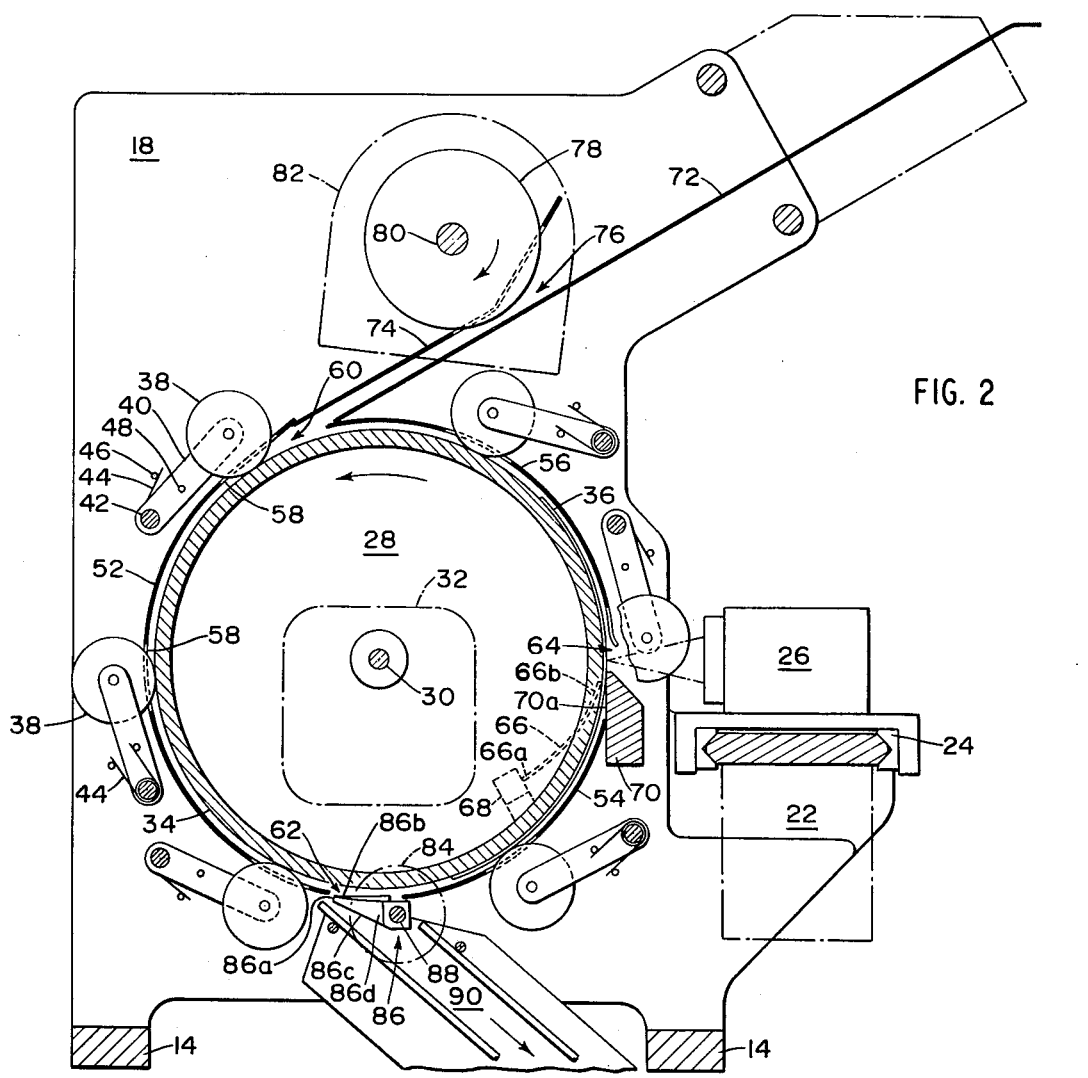
FIG. 2 is a view in vertical section taken along the line 2—2 of FIG. 1.
Figure 3:
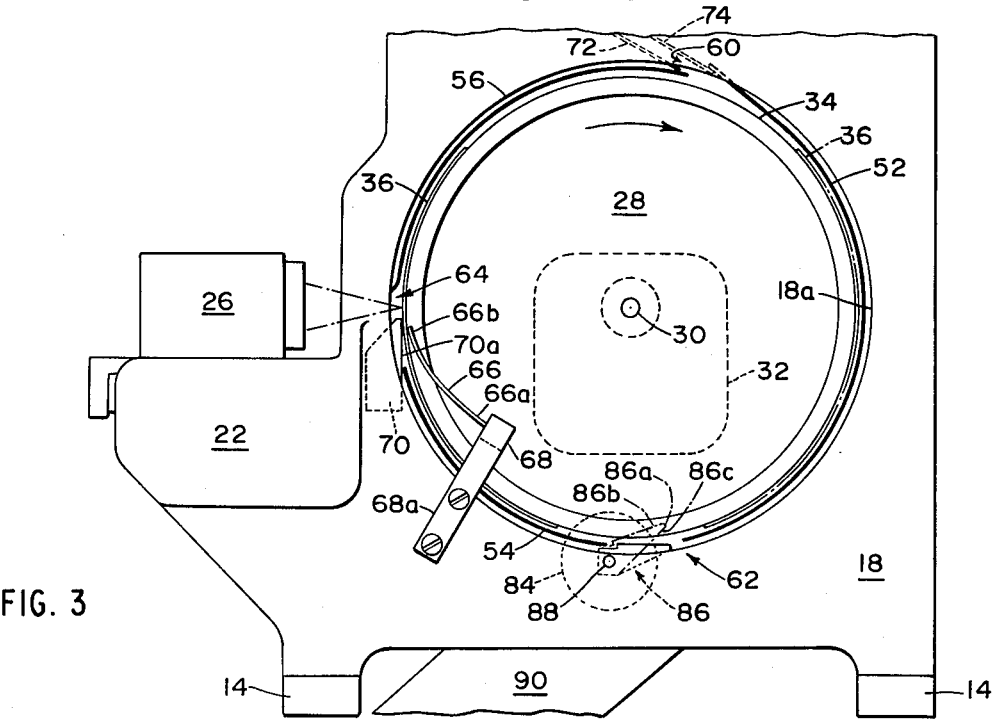
FIG. 3 is a right-side elevation view of the transporter shown in FIGS. 1 and 2.

FIGS. 1-3 illustrate the preferred embodiment of a paper transporter constructed according to the invention and adapted for use in conjunction with an optical character reader (OCR). The paper transporter is supported within a frame having a pair of longitudinally extending spaced apart base members 14 that support substantially parallel, upright side plates 16 and 18. Mounting brackets 20 and 22, formed on the side plates 16 and 18, respectively, support a longitudinally extending track member 24 that translates a pick-up head or scanning unit 26 of the OCR in an incremental or stepwise fashion along the track. The pick-up head 26 preferably includes a high intensity light source that illuminates the paper.

A principal feature of the invention is a relatively narrow hub 28 mounted on a shaft 30 of a synchronous motor 32. The outer peripheral surface 34 of the hub 28 carries a sheet of paper 36 to be scanned by the pick-up head 26. The paper is oriented so that lines of characters printed on the paper are each aligned in a plane that is substantially transverse to the axis of rotation of the hub 28. During one complete revolution of the hub, with the paper carried thereon, the pick-up head 26 reads one swath of the paper which typically includes one line of print. After reading each line, the pick-up head is translated in an incremental step to read an adjacent line of print in the succeeding revolution of the hub and the paper. In order to operate effectively, it is essential that the paper have an accurately and reliably predetermined position and spatial orientation with respect to the pick-up head 26, and maintain this position and orientation during a large number of revolutions of the paper needed to scan all of the lines of printed characters.

A set of canted rollers 38 that substantially surround the hub 28 and the paper 36 hold the paper against the hub surface 34 and simultaneously adjust the location and spatial orientation of the paper as it rotates. Each roller 38 is mounted to be freely rotatable at one end of an arm 40 pivoted on a shoulder screw 42 secured in the side plate 16. A torsion spring 44 secured about the screw 42 has its free ends compressed between a fixed pin 46 secured in the side plate 16 and a pin 48 secured in the arm 40. The spring 44 is rated to urge the roller 38 to bear lightly against the hub surface 34 or an interposed sheet of paper 36. Each roller 38 is mounted so that it is canted at a small angle $\alpha$ (FIG. 1) with respect to a reference edge.

In the illustrated embodiment the reference edge is in the form of a lip or flange 50 formed on the hub 28 and lying in a plane substantially transverse to the axis of rotation of the hub. Because of the cant, which is preferably in the order of three degrees, plus or minus one degree, the sheet 36 is quickly and reliably driven longitudinally over the hub surface 34 until its bottom edge is in an abutting relationship with the flange 50. (It will be understood that the paper can be oriented with its top edge abutting the flange 50.) Although the hub 28 may be formed from any suitable structural material, its outer peripheral surface 34 should be highly abrasion resistant. A recommended material is aluminum with a standard aluminum oxide "hard coat" finish. The rollers 38 can be formed from any conventional material such as urethane or gum rubber that has a high coefficient of friction with respect to paper and does not mark the paper due to a carbon content.

A set of guards 52, 54 and 56 assist is guiding the sheet of paper in a generally cylindrical path of rotation while it is carried on the hub. These guides each extend longitudinally between the side plates 16 and 18 and are closely spaced from the peripheral surface 34 of the hub and the exterior surface of the paper bearing the printed characters. The guards substantially enclose the hub and the paper to provide an outer limit on the position of the paper with respect to the axis of rotation. In the region over the hub, the guards also guide the paper into the nip space between the rollers 38 and the hub surface 34. The rollers 38 engage the hub through windows 58 formed in the guards 52, 54 and 56. It should be noted that although the guards extend the full length of the paper 36, they can extend only over the region of the hub. Also, although the guards are described and illustrated as solid sheet structures, they can be formed of wire mesh or solid elements that extend radially from the drum surface.

The guards 52 and 56 are spaced at a point near the top of the hub 28 to form a longitudinally extending paper entrance slot 60. Similarly, the guards 52 and 54 are spaced apart near the bottom of the hub 28 to form a longitudinally extending paper exit slot 62. The positioning of the slot 62 near the bottom of the hub utilizes the force of gravity to assist in removing the paper from the hub. The guards 54 and 56 are spaced apart at the same height as the pick-up head 26 to form a viewing slot 64.

Although the hub, the guards, the rollers, and the reference flange cooperate to carry paper 36 in a repeatedly uniform and accurately predetermined path of rotation, it is desirable to provide additional control over the position of the paper with respect to the pick-up head when it is in the region defined by the viewing slot 64. Such control is provided by a flexible brush 66 located interior to the path of rotation of the paper. The brush 66 preferably extends the full length of the viewing slot 64 with one longitudinally extending edge 66a of the brush 66 secured to a bar 68 mounted to the side plate 18 by means of an angled portion 68a. The other longitudinally extending edge 66b of the brush is free and urged by the inherent flexibility of the brush 66 against an opposed abutment strip 70 which also preferably extends the full length of the viewing slot 64. The brush 66 and opposed abutting member 70 are angled towards one another in the direction of rotation of the paper to form a converging funnel-like guide that accurately positions the outer surface of the paper in the focal plane of the pick-up head 26. Although the free end 66b can be closely spaced from the surface 70a, it preferably rests lightly against the surface 70a and is pushed off the surface 70a by the leading edge of the paper as it rotates into the viewing area. The brush 66 may be formed from any suitable structural material having the desired flexing qualities such as a thin sheet of stainless steel. The abutment strip 70 can likewise be formed of any suitable structural material but is preferably formed from aluminum with an aluminum oxide "hard coat" finish for abrasion resistance.

It should be noted that although the brush has been described as acting in cooperation with an abutting member 70, it can also be opposed by an edge or portion of the guard 54. The abutment strip is preferable, however, since it provides a maximum control at the central portion of the viewing slot where the pick-up head is focused rather than the lowermost edge of the viewing slot. In addition, the black finish of the strip 70 preferably has a light absorbing finish that reduces the amount of reflection in the viewing area which improves the reading efficiency of the OCR.

Successive sheets of paper 36 are fed from a supply stack (not shown) held on an inclined bottom plate 72 that, in cooperation with a spaced apart upper plate 74, forms an entrance chute indicated generally at 76. Rollers 78 mounted on a shaft 80 driven by a motor 82 rotates periodically under the control of a signal from the OCR to feed a single sheet from the supply stack and direct it through the chute 76 and the paper entrance slot 60 to be carried on the rotating hub 28.

While the paper is being scanned, a stripper blade 86 mounted on a shaft 88 and operatively connected to the solenoid 84 is in the position shown in FIGS. 1 and 2, with its leading edge 86a clear of the rotating paper and its inwardly facing surface 86b guiding the paper across the paper exit slot 62 and under the guard 54. When the paper is completely scanned, a signal for the OCR triggers the solenoid to pivot the blade to the position shown in phantom in FIG. 3 so that the leading edge of the advancing paper (shown in phantom in FIG. 3) strikes the sloped outwardly facing surface 86c of the stripper blade and is directed away from the hub 28 into a paper exit chute 90. The end 86d of the stripper blade adjacent the side plate 16 is notched to clear the hub 28 when it pivots into the paper removal position. It should be noted that because of the "drumless" construction of the invention, it is also possible to mount the stripper blade within the path of rotation of the paper. With this arrangement, the blade pivots to a point at or outside of the path of rotation to direct the paper to the exit chute 90.

Since there is no internal support for the paper except the relatively narrow hub 28, the stripper blade can pivot so that its leading edge 86a projects to a position within the path of rotation of the paper. This provides a highly reliable means for removal of the paper which is not dependant on the stripper assembly or the hub being machined to close dimensional tolerance. This system is relatively independent of any electrostatic attraction between the paper and the hub. Because of this reduced sensitivity to electrostatic forces, as well as a reduction in the level of the electrostatic force due to the relatively small area of contact between the paper and an interior supporting member (a relatively narrow hub as compared to a drum extending the full length of the paper), the paper transporter of this invention is relatively insensitive to environmental conditions such as temperature and humidity.

In operation, a sheet of paper is fed by a rotation of the wheels 78 from the supply stack, through the chute 76 and the paper entrance slot 60, to the hub 28. The left edge of the paper is leading and the side to be read facing upwardly. In most applications, the paper will have the standard 8½ inch by 11 inch dimension, but a wide range of sizes and shapes are acceptable. By way of illustration, but not of limitation, the hub 28 has a diameter in the range of 6 inches and the peripheral surface 34 has a width of approximately one inch.

The leading edge of the paper is gripped between the roller 38 adjacent the paper entrance slot 60 and the exterior peripheral surface 34 of the hub. The rotation of the hub draws the paper under the roller 38 and carries the paper at substantially the same rate of rotation as the hub itself. A typical rate of rotation is 120 rpm which provides a scan rate of two lines per second. The rollers 38, in cooperation with the guards 52, 54 and 56 hold the paper on the surface of the hub. Due to the cant of each of the rollers 38, the paper is driven in a longitudinal direction towards the reference flange 50 until the bottom edge of the paper is in an abutting relationship with the reference flange. Typically the paper is thus dynamically adjusted into the desired position and spatial orientation in only a partial revolution of the hub, but it is usually preferable to carry the paper through one or two complete revolutions before initiating the scanning to ensure that the paper is accurately positioned and aligned. During each successive revolution of the paper, the pick-up head 26 scans one swath or line of printed characters on the paper and then translates in an incremental, step-wise fashion to read an adjacent swath or line of printed characters in the succeeding revolution of the paper. A significant advantage of the drumless structions of the invention is that a "paper present" or "paper not present" condition at the viewing slot is readily detected by the pick-up head 26 since there is a sharp contrast between the light reflecting qualities of the paper and the absence of any material in the viewing slot. Thus with the present invention the presence of the leading edge of the paper in the viewing slot can generate a signal that translates the pick-up head 26 to scan the next line of print. In particular, this arrangement is distinct from the situation where the paper is carried on a drum and the drum surface is specifically treated to have different optical qualities than those of the paper.

This process continues, with the rollers 38 providing continuous adjustment of the paper, until all of the lines of printed material have been scanned. The OCR then generates a signal that activates the solenoid 84 to pivot the stripper blade 86 into the paper removal position and the leading edge of the scanned sheet is directed along the surface 86c of the stripper blade into the paper exit chute 90. When the scanned page is removed from the transporter, the OCR may generate a signal to feed the next sheet.

A significant advantage of this invention is that the transporter will accept and align sheets of paper that are in a slightly damaged condition, that is, creased, wrinkled or having folded corners, without jamming. Also, the paper transporter of this invention will accept and read sheets of paper having ragged or serrated edges such as commonly found in computer print out sheets. Moreover, if a sheet of paper should jam, another significant advantage of the invention is that the paper jam is quickly and conveniently cleared by reaching through a circular opening 18a formed in the side plate 18 and grapsing the jammed paper manually. It should be noted that this extremely simple and convenient method of clearing jams is allowed by the "drumless" nature of the transporter described hereinabove. Because of this case of clearing paper jams, in addition to a low environmental sensitivity, continuous operation during paper feed and removal and accurate paper control, it is contemplated that this invention can be used in other structural environments such as document reading and handling equipment including facsimile equipment.

There has been described and illustrated a paper transporter for use in conjunction with an OCR that is readily cleared of paper jams, scans a succesion of papers during continuous operation, obscures only a minimum surface area of the paper being scanned with no ink transfer between successive pages, accepts paper in a variety of conditions, and accurately aligns and positions the paper during multiple scanning revolutions. In addition, there has been described a paper transporter that develops a minimum static electric buildup during operation, requires few parts machined to close dimensional tolerance, and has a comparatively low cost of manufacture.

Although the invention has been described with the reference edge as a lip or flange formed on the hub itself, it will be understood that the side plate 16 can serve as a reference edge provided that its inwardly facing surface lies in a plane substantially transverse to that of the axis of rotation of the hub. Also, it will be understood that there is some degree of latitude in the width of the hub, depending on such factors as the length and stiffness of the paper being scanned, and the cost of manufacturing the hub, including the cost of manufacturing the hub surface 34 to a high degree of roundness. In general the hub width is preferably a small fraction of the length of the paper. In addition, although the invention has been described with freely rotatable canted rollers to steer the paper against the reference edge and hold it against the drum, the rollers can be driven in conjunction with the hub or the hub can be freely rotatable and driven exclusively by the rollers. Further, the rollers themselves can be replaced by a belt or sets of belts which engage the exterior peripheral surface of the hub about its circumference and are canted to steer the paper against the reference edge. These alternative arrangements, however, are generally more costly to effect and have a somewhat reduced operational efficiency. In particular, the use of belts in place of the rollers tends to significantly increase the build up of the static charge since the belts tend to behave as miniature Van de Graff generators. It should also be noted that the reliablity of the paper stripper and removal system does not depend on the force of gravity, and therefore the paper exit slot 62 does not have to be located near the bottom of the hub. Similarly the paper entrance slot 60 and the viewing slot 64 can be located at other positions than those described hereinabove.

One skilled in the art will also readily devise alternative configurations or structures to perform the function of the brush, stripper blade and paper feed mechanisms described hereinabove. These and various other modifications will become apparent to those skilled in the art in the foregoing description and accompany drawings. These such modifications are intended to fall within the scope of the appended claims.

What is claimed is:

1. A transporter of a sheet of paper for use in conjunction with an optical character reader having a pick-up head that translates along a first direction, comprising in combination, a hub rotatable about its central longitudinal axis and extending along said axis for a distance substantially less than the length of the sheet, said axis being aligned in said first direction, a reference edge located proximate one end of said hub lying in a plane substantially transverse to said axis, means for rotating said hub, a plurality of rollers that engage the periphery of said hub and hold the sheet on said periphery, said rollers being canted towards said reference edge in the direction of said rotation to dynamically adjust the sheet, said hub, rollers and reference edge cooperating to hold the sheet in a spaced relationship with said pick-up head as it rotates, supported on said hub, along a generally cylindrical path, a plurality of guards spaced closely from the periphery of said hub and substantially encircling the sheet at least in the region about said hub to maintain the sheet in said generally cylindrical path as it rotates on the hub, said guards being spaced from one another to form input and output slots and a viewing slot that each extend in said first direction, and a flexible brush located interior to said cylindrical path having a free edge extending in said first direction and proximate said viewing slot, said free edge engaging the surface of said sheet opposite said pick-up head to control said spacing between said pick-up head and said sheet along the length of said paper in said first direction.

2. A paper transporter according to claim 1 further comprising means for automatically feeding the sheet through said input slot onto the hub and means for automatically removing the sheet from the hub through said output slot.

3. A paper transporter according to claim 2 in which said removing means comprises a stripper blade extending in said first direction that is pivotable between a first position in which it directs the sheet to continue rotation and a second position in which a portion of the blade lies inside the path of rotation of the sheet to direct it to said output slot.

4. A paper transporter according to claim 1 wherein said spacing control means further comprises an abutment strip extending in said first direction and positioned to oppose the free edge of said brush.

5. A paper transporter according to claim 4 in which said hub has a highly abrasion resistant finish and said abutment strip has a highly abrasion resistant finish that reduces reflection.

* * * * *